United States Patent
Wang et al.

(10) Patent No.: US 10,503,301 B2
(45) Date of Patent: Dec. 10, 2019

(54) TOUCH DISPLAY PANEL AND TOUCH DISPLAY DEVICE

(71) Applicant: SHANGHAI TIANMA AM-OLED CO., LTD., Shanghai (CN)

(72) Inventors: Qingxia Wang, Shanghai (CN); Kaihong Huang, Shanghai (CN); Min Chen, Shanghai (CN); Gaojun Huang, Shanghai (CN); Juan Zhu, Shanghai (CN)

(73) Assignee: SHANGHAI TIANMA AM-OLED CO., LTD., Shanghai (CN)

( * ) Notice: Subject to any disclaimer, the term of this patent is extended or adjusted under 35 U.S.C. 154(b) by 0 days.

(21) Appl. No.: 15/957,623

(22) Filed: Apr. 19, 2018

(65) Prior Publication Data

US 2019/0204964 A1 Jul. 4, 2019

(30) Foreign Application Priority Data

Jan. 2, 2018 (CN) .......................... 2018 1 0002742

(51) Int. Cl.
*G06F 3/041* (2006.01)
*G06F 3/044* (2006.01)

(52) U.S. Cl.
CPC .......... *G06F 3/0412* (2013.01); *G06F 3/0443* (2019.05); *G06F 3/0446* (2019.05); *G06F 2203/04103* (2013.01); *G06F 2203/04111* (2013.01)

(58) Field of Classification Search
USPC ................................................. 345/173–174
See application file for complete search history.

(56) References Cited

U.S. PATENT DOCUMENTS

| | | | | |
|---|---|---|---|---|
| 2014/0176465 A1* | 6/2014 | Ma | ........................ | G06F 3/041 345/173 |
| 2014/0267947 A1* | 9/2014 | Yeh | ...................... | G06F 3/03547 349/12 |
| 2017/0317145 A1* | 11/2017 | Hong | .................... | H01L 27/323 |
| 2018/0122864 A1* | 5/2018 | Lee | ......................... | G06F 3/0412 |
| 2018/0122867 A1* | 5/2018 | Choe | ..................... | G06F 3/0412 |
| 2018/0203555 A1* | 7/2018 | Miyamoto | .............. | G06F 3/044 |
| 2018/0373359 A1* | 12/2018 | Han | ........................ | G06F 3/044 |
| 2019/0064958 A1* | 2/2019 | Liu | .......................... | G06F 3/044 |

FOREIGN PATENT DOCUMENTS

| | | |
|---|---|---|
| CN | 101635304 A | 1/2010 |
| CN | 103376938 A | 10/2013 |

* cited by examiner

*Primary Examiner* — Kwin Xie
(74) *Attorney, Agent, or Firm* — Alston & Bird LLP (57) ABSTRACT

A touch display panel includes first touch electrodes arranged in a first direction and extending along a second direction, second touch electrodes arranged in the second direction and extending along the first direction, and sub-pixels; each first touch electrode comprises first electrode blocks arranged in the second direction, every two adjacent first electrode blocks are connected to each other, each second touch electrode comprises second electrode blocks made of metal, every two adjacent second electrode blocks are connected to each other by a bridge structure which is transparent and in the same layer as the second electrode blocks, an orthographic projection of the second electrode block on a plane of the touch display panel is enclosed within an orthographic projection of the non-aperture portion of the sub-pixel on the plane. A touch display device includes the touch display panel.

20 Claims, 8 Drawing Sheets

TOUCH DISPLAY PANEL AND TOUCH DISPLAY DEVICE

CROSS-REFERENCE TO RELATED APPLICATIONS

The present application claims priority to Chinese Patent Application No. CN 201810002742.6, filed on Jan. 2, 2018, the content of which is incorporated herein by reference in its entirety.

TECHNICAL FIELD

The present disclosure relates to the technical field of display technologies and, particularly, relates to a touch display panel and a touch display device.

BACKGROUND

Figure 1:
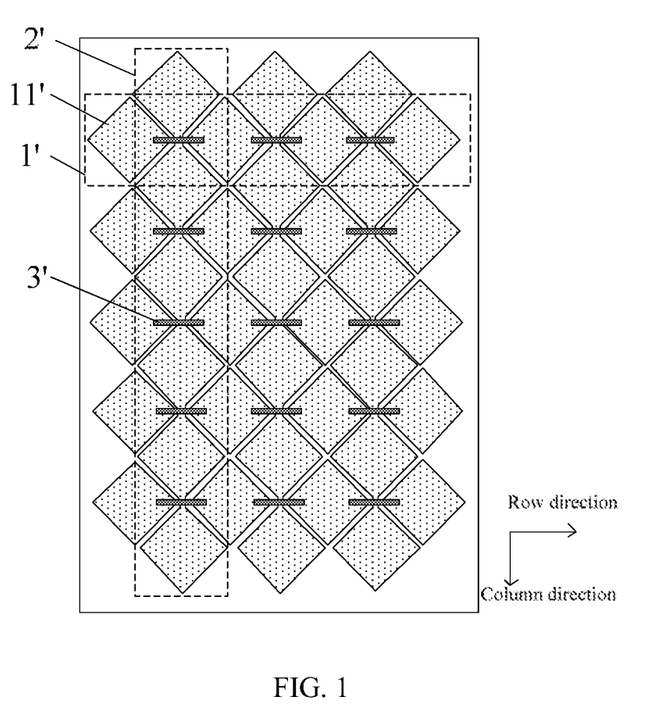
FIG. 1 illustrates a schematic diagram showing a structure of a touch display panel according to an embodiment in the related art.

With the development of display technologies, touch display panels with touch functions have been widely used. As shown in FIG. 1, a plurality of touch sensing electrodes 1' arranged in a column direction and a plurality of touch drive electrodes 2' arranged in a row direction are provided in a display area of the touch display panel. The touch sensing electrodes 1' and the touch drive electrodes 2' are all made of transparent material. Each touch sensing electrode 1' includes a plurality of touch sensing electrodes 11' arranged in a row direction, and two adjacent touch sensing electrodes 11' are connected with each other by a metal bridge 3'.

Since the metal material appears dark because it is light tight, the metal bridge 3' needs to be formed thin enough so as to reduce visibility of the metal bridge 3'. However, when electrostatic discharge occurs in the display panel, a large amount of electrostatic charge will be transferred in a short period of time, resulting in a relatively high electrostatic current. When the electrostatic current flows through the metal bridge 3', the bridge 3' may break and thus be disconnected, in turn adversely affecting the performance of the display panel.

SUMMARY

The present disclosure provides a touch display panel and a touch display device, which can solve the above-mentioned problems.

In a first aspect of the present disclosure, a touch display panel is provided. The touch display panel includes: a plurality of first touch electrodes, wherein the plurality of first touch electrodes is arranged in a first direction and extends along a second direction, wherein each of the plurality of first touch electrodes comprises a plurality of first electrode blocks arranged in the second direction, and every two adjacent first electrode blocks along the second direction of the plurality of first electrode blocks are connected to each other; a plurality of second touch electrodes, wherein the plurality of second touch electrodes is arranged in the second direction and extends along the first direction, wherein each of the plurality of second touch electrodes comprises a plurality of second electrode blocks arranged in the first direction, and every two adjacent second electrode blocks along the first direction of the plurality of second electrode blocks are connected to each other via a bridge structure, wherein the bridge structure and the plurality of second electrode blocks are arranged in different layers, the plurality of second electrode blocks is made of metal, and the bridge structure is transparent; and a plurality of sub-pixels, wherein each sub-pixel of the plurality of sub-pixels comprises an aperture and a non-aperture portion. Each second electrode block of the plurality of second touch electrodes is in a grid structure and an orthographic projection of the plurality of second electrode blocks on a plane of the touch display panel is enclosed within an orthographic projection of the non-aperture portion of the sub-pixel on the plane.

In a second aspect of the present disclosure, a touch display device is provided. The touch display device includes the touch display pane according to the first aspect of the present disclosure.

BRIEF DESCRIPTION OF DRAWINGS

In order to more clearly illustrate technical solutions of embodiments of the present disclosure, the accompanying drawings used in the embodiments are briefly described below. The drawings described below are merely a part of the embodiments of the present disclosure. Based on these drawings, those skilled in the art can obtain other drawings without any creative effort.

DESCRIPTION OF EMBODIMENTS

In order to better understand technical solutions of the present disclosure, the embodiments of the present disclosure are described in details with reference to the drawings.

It should be clear that the described embodiments are merely part of the embodiments of the present disclosure rather than all of the embodiments. All other embodiments obtained by those skilled in the art without paying creative labor shall fall into the protection scope of the present disclosure.

The terms used in the embodiments of the present disclosure are merely for the purpose of describing specific embodiment, rather than limiting the present disclosure. The terms "a", "an", "the" and "said" in a singular form in the embodiment of the present disclosure and the attached claims are also intended to include plural forms thereof, unless noted otherwise.

It should be understood that the term "and/or" used in the context of the present disclosure is to describe a correlation relation of related objects, indicating that there may be three relations, e.g., A and/or B may indicate only A, both A and B, and only B. In addition, the symbol "/" in the context generally indicates that the relation between the objects in front and at the back of "/" is an "or" relationship.

It should be understood that although the terms 'first' and 'second' may be used in the present disclosure to describe touch electrodes, these touch electrodes should not be limited to these terms. These terms are used only to distinguish the touch electrodes from each other. For example, without departing from the scope of the embodiments of the present disclosure, a first touch electrode may also be referred to as a second touch electrode. Similarly, the second touch electrode may also be referred to as the first touch electrode.

Figure 2:
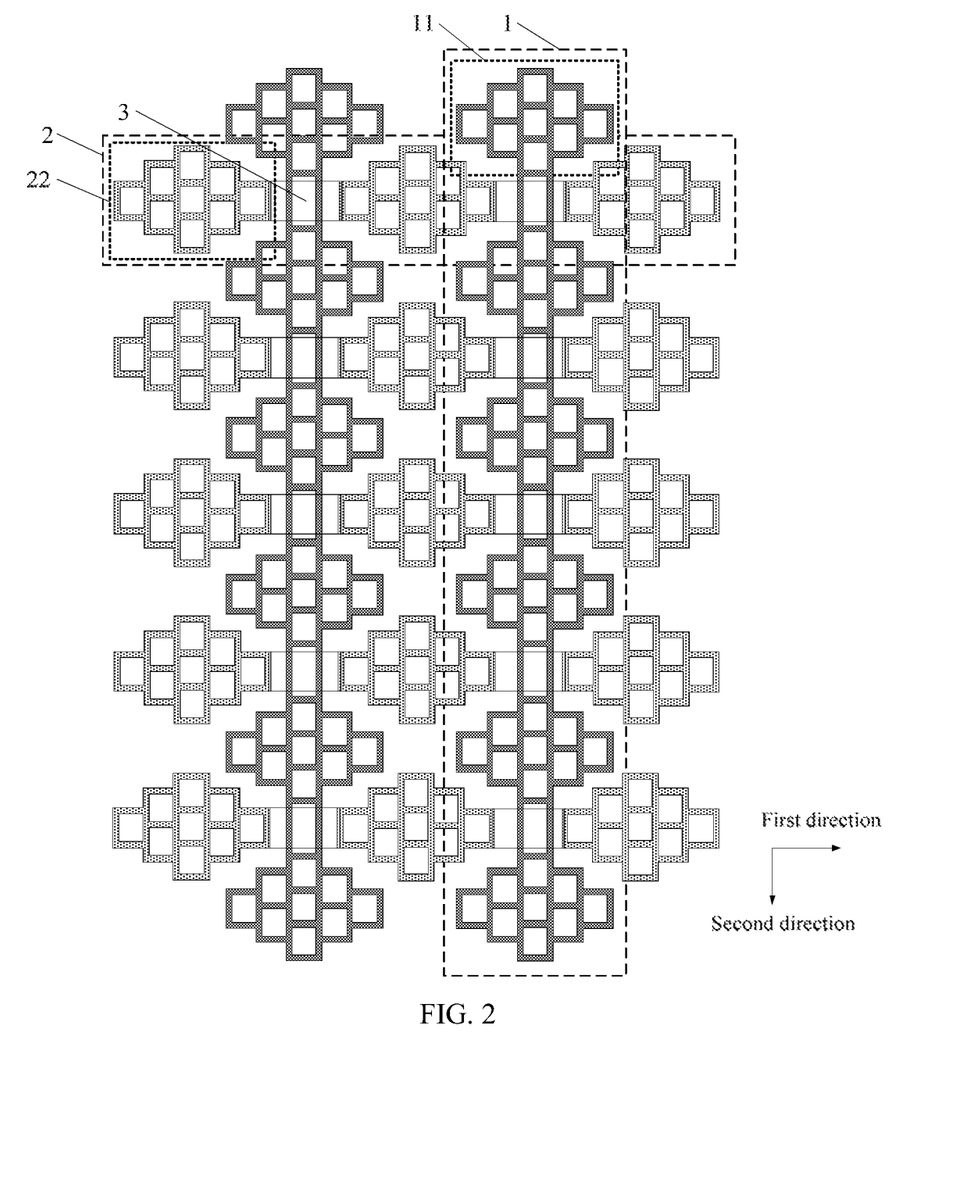
FIG. 2 illustrates a schematic diagram showing a structure of a touch display panel according to an embodiment of the present disclosure.

An embodiment of the present disclosure provides a touch display panel which includes a plurality of first touch electrodes 1 and a plurality of second touch electrodes 2, as shown in FIG. 2. The first touch electrodes 1 are arranged in a first direction and extend along a second direction. The second touch electrodes 2 are arranged in the second direction and extend along the first direction.

Each of the first touch electrodes 1 includes a plurality of first electrode blocks 11 arranged in the second direction, and every two adjacent first electrode blocks 11 are connected to each other. Each of the second touch electrodes 2 includes a plurality of second electrode blocks 22 arranged in the first direction, and every two adjacent second electrode blocks 22 are connected to each other by a bridge structure 3. The second electrode blocks 22 are provided in a different layer from the bridge structure 3. The second electrode blocks 22 are metal electrodes, and the bridge structure 3 includes transparent bridges.

The touch display panel further includes a plurality of sub-pixels (not shown). Each sub-pixel includes an aperture and a non-aperture portion. Each of the second electrode blocks 22 is in a grid structure. An orthographic projection of a second electrode block 22 on a plane of the touch display panel is enclosed within an orthographic projection of the non-aperture portion of the sub-pixel on the plane.

It should be noted that the first direction and the second direction correspond to the row direction and the column direction. The first direction is the row direction and the second direction is the column direction, or the first direction is the column direction and the second direction is the row direction. In respective drawings of the present embodiments, for sake of illustration, the first direction is the row direction and the second direction is the column direction.

In the present embodiment, the second electrode block 22 included in the second touch electrode 2 may be made of a metal material such as molybdenum, silver, aluminum and so on. The bridge structure 3 connecting two adjacent second electrode blocks 22 may be made of a light-transparent material such as indium tin oxide and so on, and thus, the arrangement of the bridge structure 3 would not block light emitted by the sub-pixels. Compared with the solution using the metal bridge in the prior art, the touch display panel provided by the present embodiment can use a relatively wider transparent bridge structure 3 between two adjacent second electrode blocks 22. In this manner, when the electrostatic discharge occurs due to accumulation of electrostatic charges, the wider bridge structure 3 can reduce the risk of the bridge structure 3 being broken down by the electrostatic current, thereby improving reliability of connections between the second electrode blocks 22 and improving touch precision.

Further, because of light-proof characteristics of metal materials, the second electrode block 22 may be set as having a grid structure, and an orthographic projection of the second electrode block 22 on a plane of the touch display panel is enclosed within the orthographic projection of the non-aperture portion of the sub-pixel on the plane, that is, each grid hole in the second electrode block 22 corresponds to the aperture of the sub-pixel. This can prevent the second electrode block 22 from blocking light emitted by the sub-pixels and prevent the second electrode block 22 from being seen by human eyes, thereby avoiding adverse effects caused by the second electrode blocks 22 on normal display.

In addition, since the surface resistance of the metal material is much smaller than that of the transparent material, the setting that the second electrodes 22 are all made of the metal material in the embodiment of the present disclosure can reduce the surface resistance of the electrodes to a certain extent, i.e., reducing load and in turn reducing power consumption during the touch operation, compared with the setting that the touch electrodes are all made of the transparent material in the prior art, in the premise of achieving the same touch precision.

It should be noted that, for sake of clear description, the present embodiment of the present disclosure splits the first touch electrode 1 into a plurality of first electrode blocks 11. However, the plurality of first electrode blocks 11 of each first touch electrode 1 can be integrally formed in an actual manufacturing process.

Figure 3:
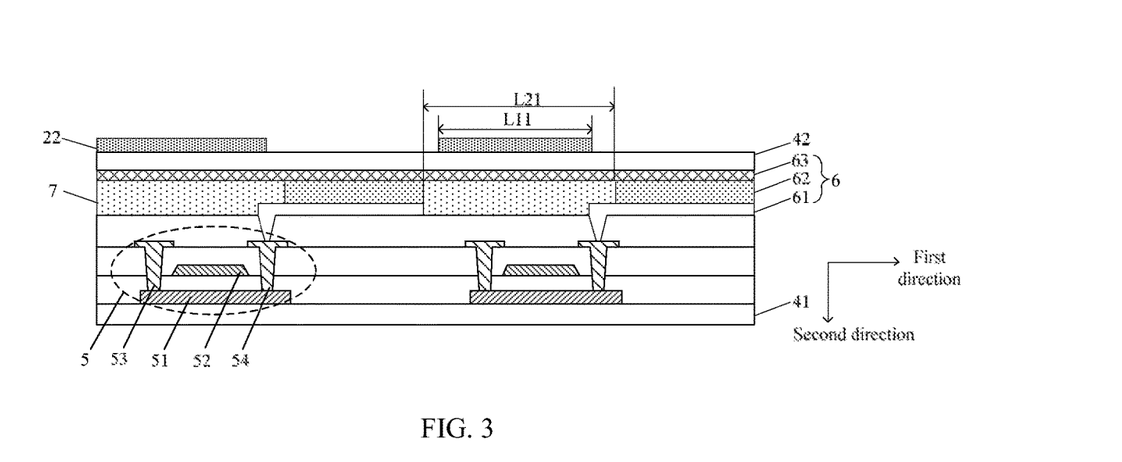
FIG. 3 illustrates a schematic diagram showing a structure of film layers of a touch display panel according to an embodiment of the present disclosure.

Taking the organic light-emitting touch display panel, the touch function of which is realized in an on-cell manner, as an example, as shown in FIG. 3, the touch display panel includes a first substrate 41, a thin film encapsulation layer 42 arranged opposite the first substrate 41, a thin film transistor 5, a light emitting element 6, and a pixel defining layer 7, and the thin film transistor 5, the light emitting element 6 and the pixel defining layer 7 are arranged between the first substrate 41 and the thin film encapsulation layer 42. The thin film transistor 5 includes a source layer 51, a gate electrode 52, a source electrode 53, and a drain electrode 54. The light emitting element 6 includes an anode 61, a light emitting layer 62, and a cathode 63. The light emitting layer 62 of the light emitting element 6 corresponds to the aperture of the sub-pixel and the pixel defining layer 7 defines the non-aperture portions of the sub-pixels. The second electrode blocks 22 are arranged on one side of the thin film encapsulation layer 42 away from the first substrate 41. The orthographic projection of the second electrode block 22 on a plane of the touch display panel is located in an orthographic projection of the pixel defining layer 7 on the plane.

When the light emitting element 6 emits light, the light is emitted out through the aperture of the sub-pixel. Since the setting position of the second electrode block 22 corresponds to the non-aperture portion of the sub-pixel, the light emitted by the light emitting element 6 would not be blocked by the second electrode block 22. Therefore, the second electrode block 22 would not adversely affect the normal luminescence of the light emitting element 6 and the second electrode block 22 is invisible.

In some embodiments, a grid in the second electrode block 22 may have a boarder having width L1 smaller than a width L2 of the pixel defining layer 7 corresponding to the border, wherein L1>3.7 μm and 14 μm ≤ L2−L1 ≤ 25 μm.

Based on the process capacity and the inventor's calculation and deduction, when L2−L1 ≤ 14 μm, a minimum gap is present between an edge of the border of the grid of the second electrode block 22 and an edge of the pixel defining layer 7, so that the orthographic projection of the second electrode block 22 on a plane of the touch display panel is enclosed within the orthographic projection of the pixel defining layer 7 on the plane. Since L2−L1 ≤ 25 μm, this can ensure that the border of the grid of the second electrode block 22 has a certain width, avoiding too thin border caused by the significant difference there-between.

The width of the border of the grid and the width of the pixel defining layer 7 are further illustrated as below. As shown in FIG. 3, as for borders arranged in the first direction in the grid, the width of each border refers to length L11 of the border along the first direction, and the width of the pixel defining layer 7 corresponding to the border refers to length L21 of the pixel defining layer in the first direction, wherein 14 μm ≤ L21−L11 ≤ 25 μm. As for borders arranged in the second direction in the grid (not shown), the width of each border refers to a length L12 of the border in the second direction, and the width of the pixel defining layer 7 corresponding to the border refers to a length L22 of the pixel defining layer along the second direction, wherein 14 μm ≤ L22−L12 ≤ 25 μm.

By setting the width of a grid in the second electrode block 22 to be smaller than the width of the pixel defining layer 7, when the position of the second electrode block 22 is slightly displaced due to factors such as external forces, the orthographic projection of the second electrode block 22 on the plane of the touch display panel is still enclosed within the orthographic projection of the pixel defining layer 7 on the plane. That is, the position of the second electrode block 22 still corresponds to the non-aperture portion of the sub-pixel. This can further prevent the second electrode block 22 from blocking the light emitted by the sub-pixel and reduce the visibility of the second electrode block 22.

In some embodiments, each grid hole in the second electrode block 22 corresponds to the aperture of at least one sub-pixel.

Taking the sub-pixel layout diagram shown in FIG. 4 as an example, relationships between grid holes and apertures of sub-pixels will be illustrated as follows.

Figure 4:
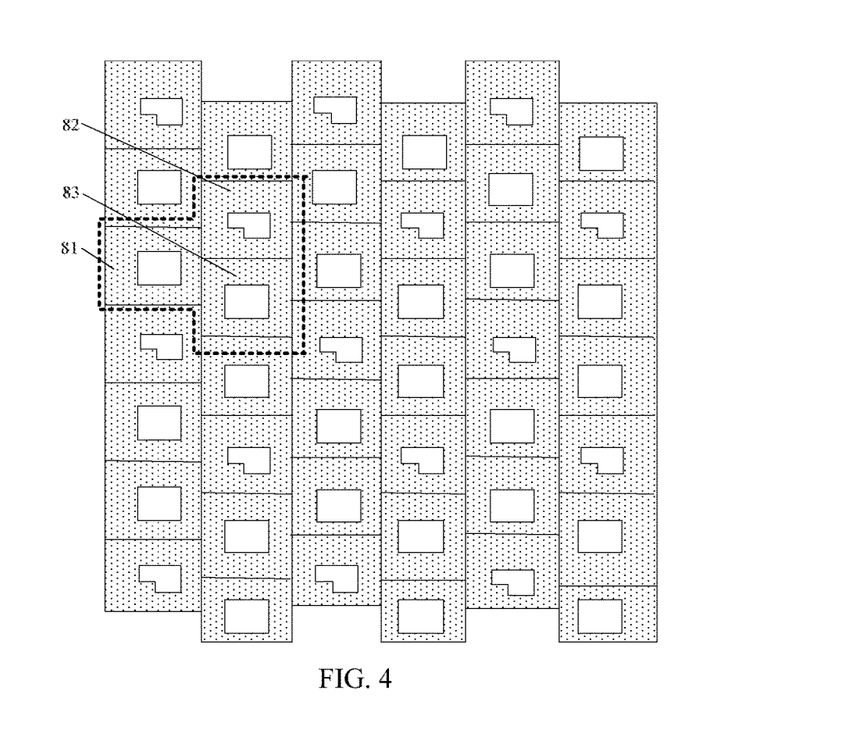
FIG. 4 illustrates a diagram showing an arrangement of sub-pixels according to an embodiment of the present disclosure.

As shown in FIG. 4, the touch display panel includes a plurality of first sub-pixels 81, a plurality of second sub-pixels 82, and a plurality of third sub-pixels 83. The first sub-pixels 81, the second sub-pixels 82, and the third sub-pixels 83 emit light of different colors.

In some embodiments, each grid hole in the second electrode block 22 corresponds to an aperture of one sub-pixel. If apertures of at least two of the plurality of sub-pixels have different shapes, it is possible that a grid hole has the same shape as that of an aperture of a corresponding sub-pixel. In order to further prevent the border of the grid from blocking the light emitted by the sub-pixel and to reduce the visibility of the border of the grid, the grid hole may have an area larger than that of an aperture of the corresponding sub-pixel. Provided that the area of the grid is S1, and the area of the aperture of the corresponding sub-pixel is S2, it may be set that 4 ≤ S1/S2 ≤ 5.5.

Based on the process capability and the inventor's calculation and deduction, it is set that S1/S2 ≤ 4, so that each grid hole exposes fully apertures of corresponding sub-pixels and the grid border is prevented from covering the apertures of the corresponding sub-pixels, thereby preventing the second electrode block 22 from blocking the light emitted by the sub-pixel. If S1/S2 ≤ 5.5, this can prevent the grid border from blocking apertures of other sub-pixels due to the excessively large area of the grid hole.

Figure 5:
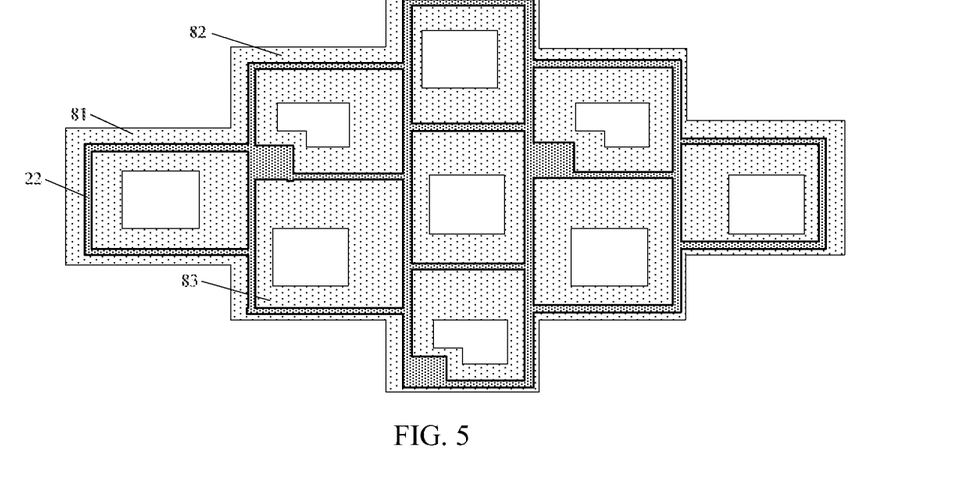
FIG. 5 illustrates a first schematic diagram showing relationships between grid holes of a second electrode block and apertures of sub-pixels in a touch display panel according to an embodiment of the present disclosure.

As shown in FIG. 5, which corresponds to the arrangement of the sub-pixels shown in FIG. 4, the second electrode block 22 includes three types of grid holes. A grid hole of a first type corresponds to an aperture of the first sub-pixel 81. The grid hole of the first type has a shape the same as that of the aperture of the first sub-pixel 81. Each grid hole of the first type has an area of S11, the aperture of each first sub-pixel 81 has an area of S21, and 4 ≤ S11/S21 ≤ 5.5. A grid hole of a second type corresponds to an aperture of the second sub-pixel 82, and the grid hole of the second type has a shape the same as that of the aperture of the second sub-pixel 82. Each grid hole of the second type has an area of S12, the aperture of each second sub-pixel 82 has an area of S22, and 4 ≤ S12/S22 ≤ 5.5. A grid hole of a third type corresponds to an aperture of the third sub-pixel 83. The grid hole of the third type has a shape the same as that of the aperture of the third sub-pixel 83. Each grid hole of the third type has an area of S13, the aperture of each third sub-pixel 83 has an area of S23, and S13/S23 ≤ 5.5.

In some embodiments, each grid hole in the second electrode block 22 corresponds to an aperture of one sub-pixel. If apertures of at least two of the plurality of sub-pixels have different shapes, it is possible that each grid hole is in the same shape. Furthermore, in order to prevent the border of the grid from blocking the light emitted by the sub-pixel and to reduce the visibility of the grids, the grid hole can have an area larger than that of the largest aperture of the sub-pixels. The area of the grid hole is S3, and the area of the largest aperture of the sub-pixels is S4, and S3 ≤ S3/S4 ≤ 4.5.

Based on the process capacity and the inventor's calculation and deduction, it is set that S3/S4 ≤ 3, so that each grid hole exposes fully apertures of corresponding sub-pixels and the grid border is prevented from covering the apertures of the corresponding sub-pixels, thereby preventing the second electrode block 22 from blocking the light emitted by the sub-pixel. If S3/S4 ≤ 4.5, this can prevent the grid border from blocking apertures of other sub-pixels due to the excessively large area of the grid hole.

Figure 6:
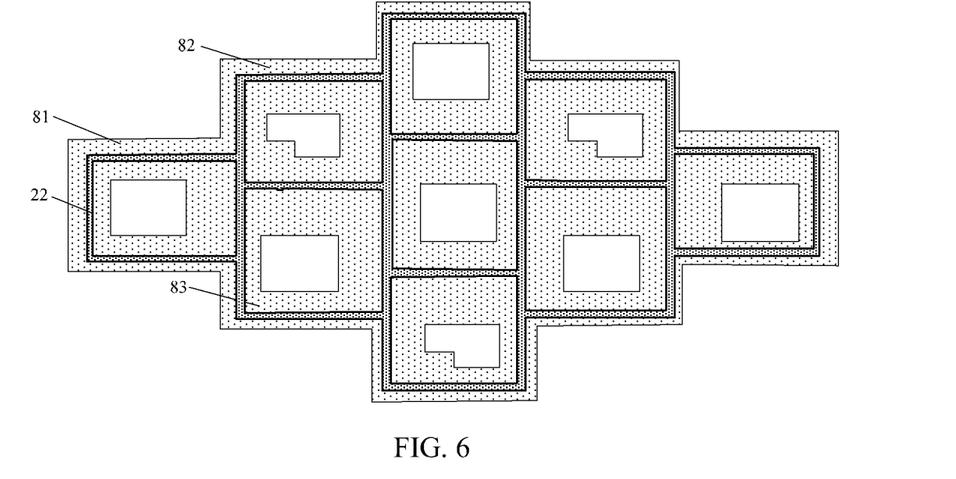
FIG. 6 illustrates a second schematic diagram showing relationships between grid holes of a second electrode block and apertures of sub-pixels in a touch display panel according to an embodiment of the present disclosure.

As shown in FIG. 6, each gird hole has an area of S3, the aperture of the first sub-pixel 81 has an area of S41, the aperture of the second sub-pixel 82 has an area of S42, and the aperture of the third sub-pixel 83 has an area of S43. Assuming that S41<S42<S43, it is necessary to meet $3 \leqslant S3/S43 \leqslant 4.5$.

It shall be noted that the shape of the grid hole may be the same as or different from the shape of the aperture of any of the first sub-pixel 81, the second sub-pixel 82, and the third sub-pixel 83, which is not limited to the embodiments of the present disclosure.

Based on FIGS. 5 and 6, when each grid hole in the second electrode block 22 corresponds to an aperture of one sub-pixel, each second electrode block 22 may include a large number of grid holes, and correspondingly, each second electrode block 22 may include a large number of grid borders. As such, when part of the grid borders in the second electrode block 22 break due to factors such as the electrostatic discharging, the unbroken grid borders can still ensure that the grid borders in the second electrode block 22 are connected with each other, so as to ensure stability of connections in the second electrode blocks 22 and improve touch precision.

In some embodiments, each grid hole in the second electrode block 22 corresponds to apertures of three sub-pixels. That is, each grid hole corresponds to one first sub-pixel 81, one second sub-pixel 82 and one third sub-pixel 83, and each grid hole is in the same shape. The grid hole has an area of S5, an aperture of one of the three sub-pixels has an area of S6, and $10.5 \leqslant S5/S6 \leqslant 13$.

It should be noted that if the aperture of the first sub-pixel 81, the aperture of the second sub-pixel 82, and the aperture of the third sub-pixel 83 are of the same area, S6 may refer to an area of the aperture of any sub-pixel. If the aperture of the first sub-pixel 81, the aperture of the second sub-pixel 82, and the aperture of the third sub-pixel 83 are of different areas, S6 may refer to an area of the largest aperture in the sub-pixels.

Based on the process capability and the inventor's calculation and derivation, it is set that $S5/S6 \leqslant 10.5$, so that each grid hole exposes fully apertures of corresponding sub-pixels and the grid border is prevented from covering the apertures of the corresponding sub-pixels, thereby preventing the second electrode block 22 from blocking the light emitted by the sub-pixels. If $S5/S6 \leqslant 13$, this can prevent the grid border from blocking the apertures of other sub-pixels due to the excessively large area of the grid hole.

Figure 7:
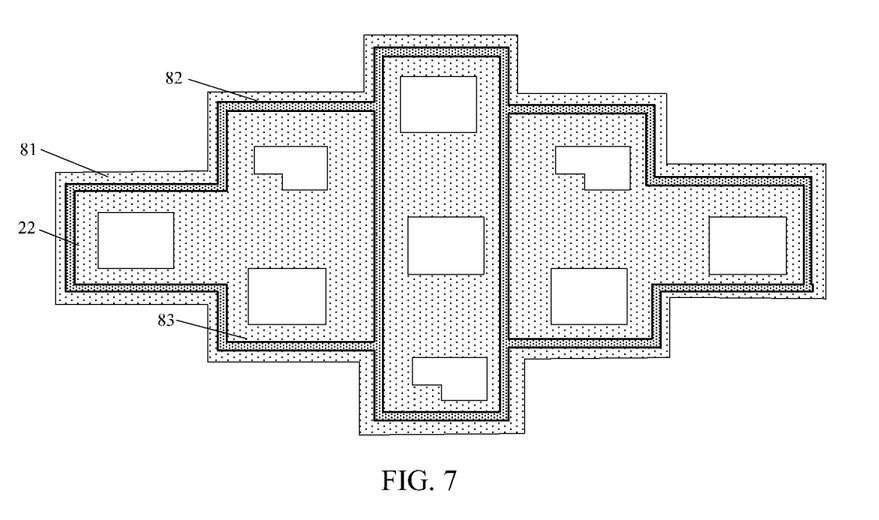
FIG. 7 illustrates a third schematic diagram showing relationships between grid holes of a second electrode block and apertures of sub-pixels in a touch display panel according to an embodiment of the present disclosure.

As shown in FIG. 7, each grid hole has an area of S3. Assuming that the aperture of the first sub-pixel 81, the aperture of the second sub-pixel 82 and the aperture of the third sub-pixel 83 have different areas, the area of the aperture of the first sub-pixel 81 is S41', the area of the aperture of the second sub-pixel 82 is S42', the area of the aperture of the third sub-pixel 83 is S43', and S41'<S42'<S43', it is necessary to meet $10.5 \leqslant S5/S43' \leqslant 13$.

It shall be noted that the shape of the grid hole may be the same as or different from the shape of the aperture of any of the first sub-pixel 81, the second sub-pixel 82, and the third sub-pixel 83, which is not limited to the embodiments of the present disclosure.

In addition, it shall also be noted that the above description is merely an exemplary illustration of the relationships between grid holes and apertures of sub-pixels. It should be understood that other relationships may also be suitable for the grid holes and the apertures of the sub-pixels, as long as the grid holes of the second electrode block 22 expose the apertures of the sub-pixels.

Figure 8:
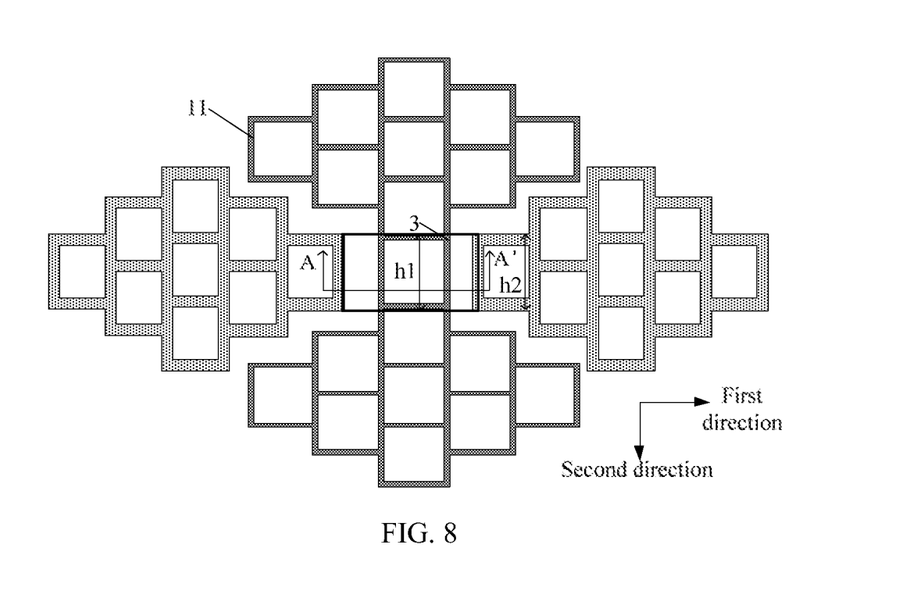
FIG. 8 illustrates a first schematic diagram showing a structure of a bridge structure in a touch display panel according to an embodiment of the present disclosure.

In addition, as shown in FIG. 8, in the first direction, two closest grids of two adjacent second electrode blocks 22 are connected to each other by a bridge structure 3.

Since the surface resistance of the light transparent material such as zinc tin oxide is large, the length of the bridge structure 3 can be reduced (i.e., the area of the bridge structure 3 can be reduced) by connecting the bridge structure 3 between the two closest grids, thereby reducing the surface resistance of the bridge structure 3 to a certain extent, i.e., reducing the load and saving the power consumption during the touch operation.

In order to realize the touch function, a plane electric field is formed between a first electrode block 11 and a corresponding second electrode block 22. If an orthographic projection of the first electrode block 11 on a plane of the touch display panel overlaps an orthographic projection of a middle portion of the bridge structure 3 on the plane to form an overlapping region, a vertical electric field is formed between the first electrode block 11 and the bridge structure 3 at the overlapping region. The vertical electric field will interfere with the plane electric field and thus adversely affect the touch precision.

Referring again to FIG. 8, in order to solve the above problem, the bridge structure 3 in the second direction may be set to have a length h1 equal to a length h2 of a grid connected to the bridge structure 3 in the second direction, i.e., h1=h2. Thus, on the one hand, this can ensure that the bridge structure 3 has a sufficient width. When the electrostatic current flows through the bridge structure 3, the bridge structure 3 is prevented from being broken down by the electrostatic current. On the other hand, it is avoided that the bridge structure 3 is too wide, so as to avoid overlapping between the bridge structure 3 and the first electrode block 11.

Figure 9:
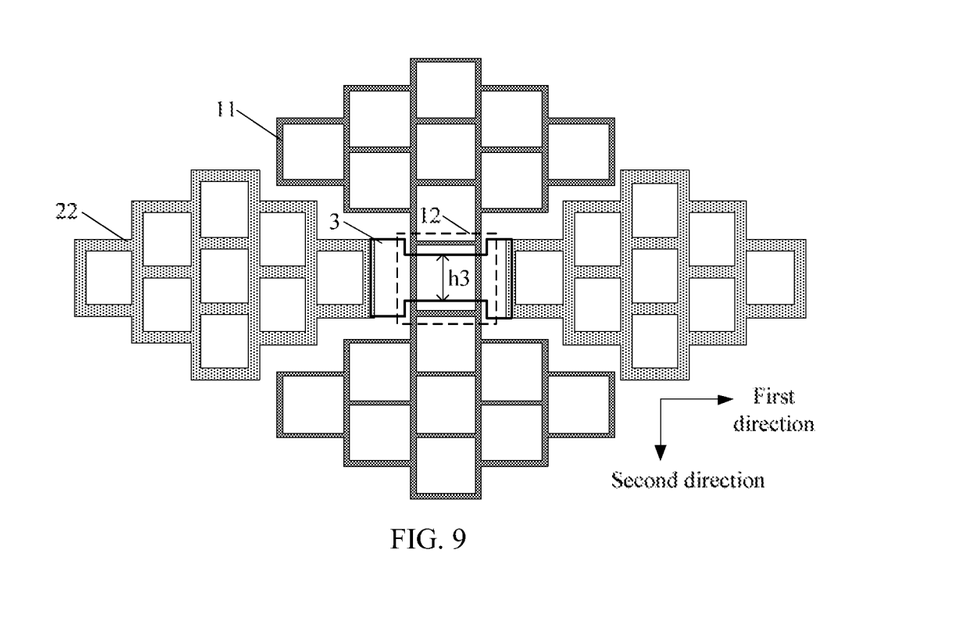
FIG. 9 illustrates a second schematic diagram showing a structure of a bridge structure in a touch display panel according to an embodiment of the present disclosure.

In addition, an orthographic projection of the connection portion between two adjacent first electrode blocks 11 in the second direction on the plane of the touch display panel inevitably overlaps an orthographic projection of the bridge structure 3 on the plane to form an overlapping region. In order to reduce the interference to the in-plane electric field by the vertical electric field formed at the overlapping region, as shown in FIG. 9, the middle portion of the bridge structure 3 in the second direction can be set to have a length h3 smaller than the length of any other portion of the bridge structure 3 in the second direction. By setting a narrower middle portion of the bridge structure 3, an area of the overlapping region between a connection portion 12 of the first electrode block 11 and the bridge structure 3 can be significantly reduced, thereby reducing intensity of the vertical electric field so as to reduce the interference to the in-plane electric field by the vertical electric field.

In some embodiments, the bridge structure 3 may be connected to the second electrode block 22 in two manners.

Figure 10:
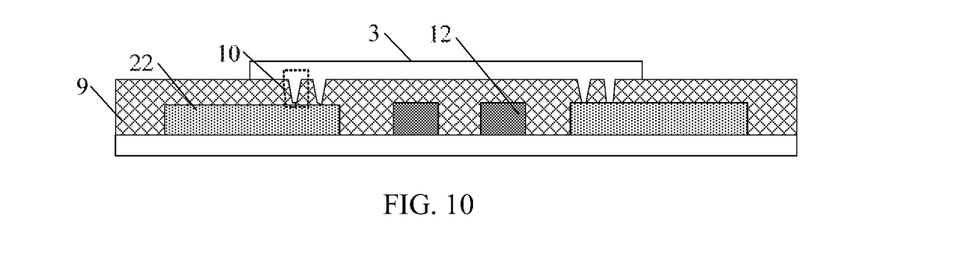
FIG. 10 illustrates a first cross-sectional diagram along direction A-A' in FIG. 8.

In a first manner, as shown in FIG. 10, which illustrates a cross-sectional view along direction A-A' in FIG. 8, a first insulation layer 9 is arranged between the connection portion 12 of two adjacent first electrode blocks 11 and the bridge structure 3. An orthographic projection of the first insulation layer 9 on the plane of the touch display panel covers the entire touch control region. A plurality of via holes 10 is defined in the first insulation layer 9. The bridge structure 3 is connected to the second electrode block 22 by the via holes 10. It shall be noted that the number of the via holes can be specifically set according to actual requirements, which is not limited in the embodiments of the present disclosure.

Since the first insulation layer 9 covers the entire touch control region, the light emitted by all of the sub-pixels needs to be emitted through the first insulation layer 9, in order to achieve uniform transmittance of the light and the uniformity of brightness of the displayed images.

Figure 11:
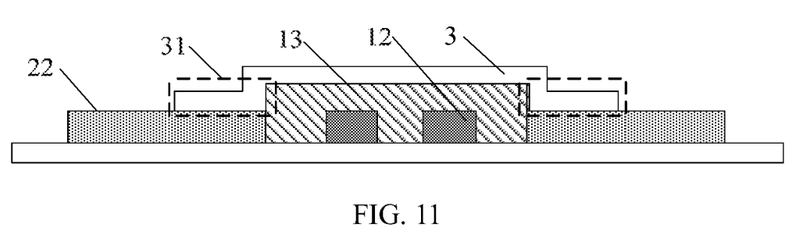
FIG. 11 illustrates a second cross-sectional diagram along direction A-A' in FIG. 8.

In a second manner, as shown in FIG. 11, which illustrates a cross-sectional view along direction A-A' in FIG. 8, a second insulation layer 13 is arranged between the connection portion 12 of two adjacent first electrode blocks 11 and the bridge structure 3.

If two adjacent first electrode blocks 11 are connected to each other by the connection portion 12, the orthographic projection of the bridge structure 3 on the plane of the touch display panel overlaps an orthographic projection of the connection portion 12 on the plane to form an overlapping region. In order to achieve insulation between the connection portion 12 and the bridge structure 3 and avoid interference to signals between the first electrode block 11 and the second electrode block 22 by the bridge structure 3, the orthographic projection of the second insulation layer 13 on the plane of the touch display panel shall cover the overlapping region. The bridge structure 3 includes, in the first direction, a contact portion 31 extending beyond the boundary of the second insulation layer 13, and the contact portion 31 is in direct contact with the second electrode block 22.

On one hand, compared with the first manner, the manner in which the contact portion 31 of the bridge structure 3 is in direct contact with the second electrode block 22 allows a larger connection region between the bridge structure 3 and the second electrode block 22. Thus, even if the electrostatic current causes breakdown to a part of a connection portion of the bridge structure 3 when flowing through the bridge structure 3, the bridge structure 3 would keep connected to the second electrode block 22. Therefore, by using the second manner, the connection stability between the bridge structure 3 and the second electrode block 22 is improved, and the touch precision is improved.

On the other hand, because the second electrode block 22 is in a grid structure, if the connection between the bridge structure 3 and the second electrode block 22 is realized by setting the via holes 10 in the first insulation layer 9, it is necessary to precisely align the position of the via holes 10 with the border of the grids of the second electrode block 22. If the setting positions of the via holes 10 are deviated, the bridge structure 3 cannot be connected to the second electrode block 22, thus adversely affecting the touch precision. However, the manner in which the contact portion 31 is in direct contact with the second electrode block 22 allows stable connection between the bridge structure 3 and the second electrode block 22 while significantly reducing the process difficulty.

In some embodiments, based on the arrangement of the sub-pixels shown in FIG. 4, in order to better align the grid holes of the second electrode block 22 with the apertures of the sub-pixels, it is set that the lengths of the second electrode blocks 22 in the second direction decrease from the middle to both sides along the first direction. For example, referring to FIG. 8 again, the second electrode block 22 may be in a rhombus structure. In some other embodiments in which the sub-pixels are arranged in other ways, the second electrode block 22 may be in other shapes, which is not limited by the embodiments of the present disclosure.

Referring again to FIG. 1, the first electrode block 11 may be a metal electrode. When the first electrode block 11 is a metal electrode, the first electrode block 11 and the second electrode block 22 are arranged in the same layer. In order to prevent the first electrode block 11 from blocking the light emitted by the sub-pixels and avoid the visibility of the first electrode block 11, the first electrode block 11 may be set in a grid structure and the orthographic projection of the first electrode block 11 on the plane of the touch display panel is enclosed within the orthographic projection of the non-aperture portion of the sub-pixel on the plane.

In addition, because the surface resistance of the metal material is small, the solution using the first electrode block 11 made of the metal material can further reduce the surface resistance of the electrode, thereby further reducing the load and reducing the power consumption during the touch operation, in the premise of achieving the same touch precision.

Further, each grid hole in the first electrode block 11 corresponds to an aperture of at least one sub-pixel.

In some other embodiments, each grid hole in the first electrode block 11 corresponds to an aperture of one sub-pixel. If apertures of at least two of the plurality of sub-pixels have different shapes, a grid hole can have the same shape as that of an aperture of a corresponding sub-pixel. Further, in order to prevent the border of the grid from blocking the light emitted by the sub-pixel and to reduce the visibility of the grid border, the grid hole may be set to have an area larger than that of the aperture of the corresponding sub-pixel. The grid hole has an area of S1', the aperture of the corresponding sub-pixel has an area of S2', and it is set that $4 \leq S1'/S2' \leq 5.5$.

Based on the inventor's calculation and deduction, $S1/S2' \leq 4$ can ensure that each grid hole exposes fully apertures of corresponding sub-pixels, and can prevent the grid border from covering the apertures of the corresponding sub-pixels, thereby preventing the second electrode block 22 from blocking the light emitted by the sub-pixels. $S1/S2' \leq 5.5$ can prevent the grid border from blocking apertures of other sub-pixels due to the excessively large area of the grid hole.

In some embodiments, each grid hole in the first electrode block 11 corresponds to an aperture of one sub-pixel. If apertures of at least two of the plurality of sub-pixels have different shapes, each grid hole can be in the same shape. In order to further prevent the grid border from blocking the light emitted by the sub-pixel and to reduce the visibility of the grid border, it may be set that the grid hole can have an area larger than that of the largest aperture. The grid hole has an area of S3', the apertures of the sub-pixels have the largest area of S4', and $3 \leq S3'/S4' \leq 4.5$.

Based on the inventor's calculation and deduction, $S3/S4' \leq 3$ can allow each grid hole to expose fully apertures of corresponding sub-pixels, and can prevent the grid border from covering the apertures of the corresponding sub-pixels, thereby preventing the second electrode block 22 from blocking the light emitted by the sub-pixels. $S3'/S4' \leq 4.5$ can prevent the grid border from blocking apertures of other sub-pixels due to the excessively large area of the gird hole.

In some embodiments, each grid hole of the second electrode block 22 corresponds to apertures of three sub pixels. The grid hole has an area of S5', the aperture of one of the three sub-pixels has an area of S6', and $10.5 \leq S5'/S6' \leq 13$.

It should be noted that if the apertures of the three sub-pixels corresponding to each grid hole have the same area, S6' refers to an area of an aperture of any one of the three sub-pixels, and if the apertures of the three sub-pixels corresponding to each grid hole have different areas, S6' refers to the largest area of the apertures of the three sub-pixels.

Based on the inventor's calculation and deduction, S5/S6' ≲ 10.5 can allow each grid hole to exposes fully apertures of corresponding sub-pixels, and can prevent the grid border from covering the apertures of the corresponding sub-pixel, thereby preventing the second electrode block 22 from blocking the light emitted by the sub-pixels. S5/S6' ≲ 13 can prevent the grid border from blocking apertures of other sub-pixels due to the excessively large area of the grid hole.

The relationships between the grid holes in the first electrode block 11 and the apertures of the sub-pixels are similar to those between the grid holes in the second electrode block 22 and the apertures of the sub-pixels as shown in FIGS. 5-7, and will not be described herein.

Figure 12:
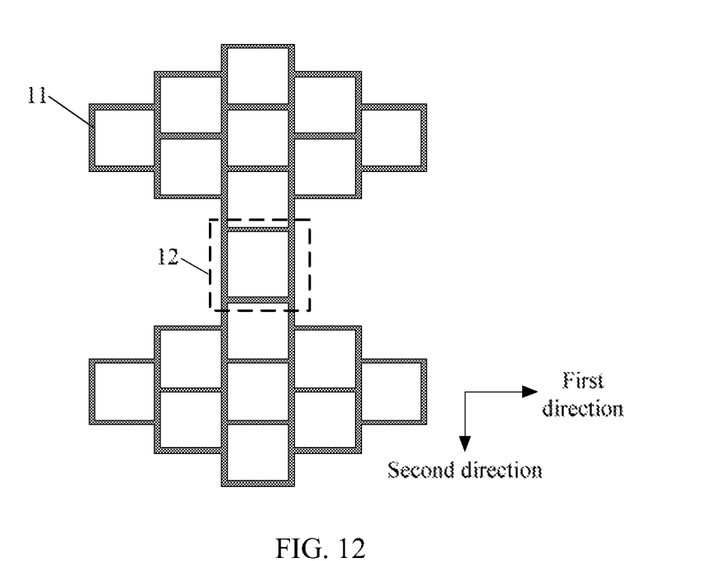
FIG. 12 illustrates a schematic diagram showing a structure of a connection portion in a touch display panel according to an embodiment of the present disclosure.

In some embodiments, as shown in FIG. 12, if the first electrode block 11 is a metal electrode, in order to simplify the manufacturing process, the connection portion 12 connected between two adjacent first electrode blocks 11 in the second direction can be a metal connection portion, the connection portion 12 is made of the same metal material as the first electrode block 11, and the connection portion 12 and the first electrode block 11 are arranged in the same layer.

It shall be noted that in the described embodiments, the first touch electrode 1 is split into a plurality of first electrode blocks 11 and a plurality of connection portions 12 in order to clearly describe the solutions of the embodiments. It is understandable that, the first electrode blocks 11 and the connection portions 12 of the first touch electrode 1 can be integrally formed in the actual manufacturing process.

In order to prevent the connection portion 12 from blocking the light emitted by the sub-pixels and reduce the visibility of the connection portion 12, the connection portion 12 may be set in a grid structure, an orthographic projection of a grid border of the connection portion 12 on the touch display panel is enclosed within an orthographic projection of the non-aperture portion of the sub-pixel on the touch display panel.

Each grid hole of the connection portion 12A corresponds to an aperture of at least one sub-pixel. Relationships between the grid holes of the connection portion 12 and apertures of sub-pixels are the same as those between the grid holes in the first electrode block 11 and in the second electrode block 22 and the apertures of the sub-pixels, which have been already described in details in the above embodiments and will not be described herein.

In some embodiments, based on the arrangement manner of the sub-pixels shown in FIG. 4, it is set that the lengths of the first electrode blocks 11 in the second direction decrease from the middle to both sides along the first direction, in order to achieve the better alignment between the grid holes of the first electrode block 11 and the apertures of the sub-pixels. For example, referring again to FIG. 8, the first electrode block 11 may be in a rhombus structure. If the sub-pixels are arranged in other manners, the first electrode block 11 may be in other shapes, which is not limited in the present disclosure.

Figure 13:
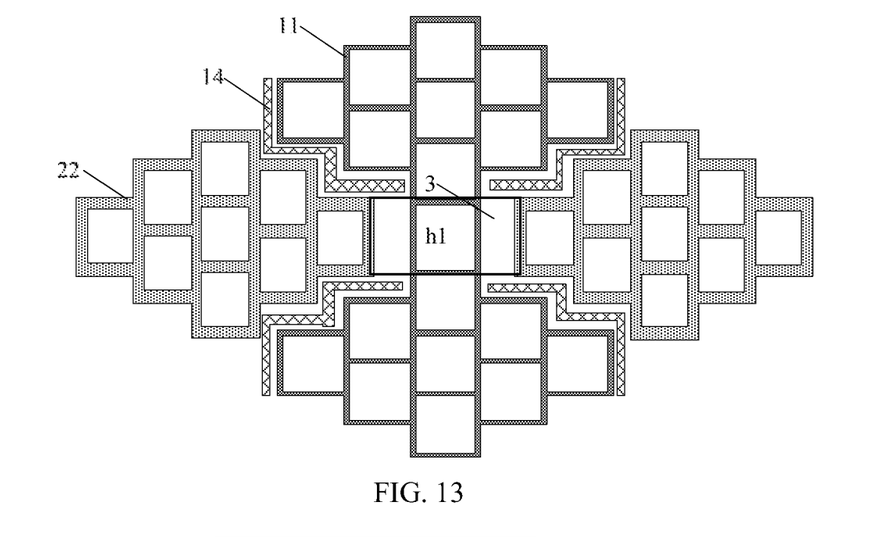
FIG. 13 illustrates a schematic diagram showing a structure of a dummy electrode in a touch display panel according to an embodiment of the present disclosure.

In some embodiments, as shown in FIG. 13, a dummy electrode 14 can be arranged between one first electrode block 11 and one second electrode block 22, which are adjacent. The first electrode blocks 11 are separated from the second electrode blocks 22 by the dummy electrode 14, thereby reducing signal interference between the first electrode blocks 11 and the second electrode blocks 22.

In some embodiments, if the touch display panel includes a touch sensing electrode and a touch drive electrode, the first touch electrode 1 is the touch sensing electrode and the second touch electrode 2 is the touch drive electrode, or the first touch electrode 1 is the touch drive electrode and the second touch electrode 2 is the touch sensing electrode.

In some embodiments, both the first electrode blocks 11 and the second electrode blocks 22 can be made of a metal material, which includes molybdenum, silver or aluminum. Since each of molybdenum, silver, and aluminum materials has a low surface resistance, the first electrode block 11 and the second electrode block 22 being made of the molybdenum, silver or aluminum material can load a relatively larger load, thereby reducing the power consumption required during the touch operation.

In some embodiments, the bridge structure 3 may be made of indium tin oxide, indium zinc oxide or indium gallium zinc oxide. The bridge structure 3 being made of indium tin oxide, indium zinc oxide or indium gallium zinc oxide can lead to a high light transmittance for the bridge structure 3.

Figure 14:
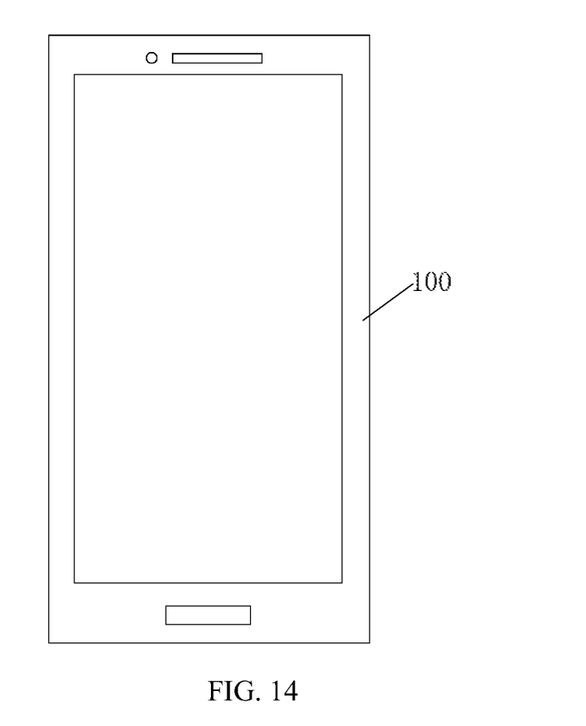
FIG. 14 illustrates a schematic diagram showing a structure of a touch display device according to an embodiment of the present disclosure.

In accordance with some embodiments, the present disclosure further provides a touch display device as shown in FIG. 14. The touch display device includes the touch display panel 100 as mentioned above. The specific configuration of the touch display panel 100 has been described in details in the above embodiments and will not be described herein. The touch display device shown in FIG. 14 is merely exemplary, and it may be any electronic device with the display function, such as a mobile phone, a tablet computer, a laptop, an e-book or a television.

Since the touch display device provided in the embodiments of the present disclosure includes the touch display panel as described above, the touch display device can use a wider transparent bridge structure between two adjacent second electrode blocks in the touch display panel 100, in comparison with the prior art. In this way, when the electrostatic discharge occurs due to accumulation of electrostatic charges, the wider bridge structure can reduce the risk of the bridge structure being broken down by the electrostatic current, thereby improving the touch precision of the touch display device.

The above are merely preferred embodiments of the present disclosure, which, as mentioned above, are not used to limit the present disclosure. Whatever within the principles of the present disclosure, including any modification, equivalent substitution, improvement, etc., shall fall into the protection scope of the present disclosure.

What is claimed is:

1. A touch display panel, comprising:
   a plurality of first touch electrodes, wherein the plurality of first touch electrodes is arranged in a first direction and extends along a second direction, wherein each of the plurality of first touch electrodes comprises a plurality of first electrode blocks arranged in the second direction, and every two adjacent first electrode blocks along the second direction of the plurality of first electrode blocks are connected to each other;
   a plurality of second touch electrodes, wherein the plurality of second touch electrodes is arranged in the second direction and extends along the first direction, wherein each of the plurality of second touch electrodes comprises a plurality of second electrode blocks arranged in the first direction, and every two adjacent second electrode blocks along the first direction of the plurality of second electrode blocks are connected to each other via a bridge structure, wherein the bridge structure and the plurality of second electrode blocks are arranged in different layers, wherein the plurality of second electrode blocks is made of metal, and wherein the bridge structure is transparent; and a plurality of sub-pixels, wherein each sub-pixel of the plurality of sub-pixels comprises an aperture and a non-aperture portion;

wherein two adjacent first electrode blocks of the plurality of first electrode blocks in the second direction are connected to each other by a connection portion, wherein an insulation layer is arranged between the connection portion and the bridge structure, and wherein the insulation layer is in direct contact with both the bridge structure and the plurality of second electrode blocks; and wherein each second electrode block of the plurality of second touch electrodes has a grid structure, and an orthographic projection of the plurality of second electrode blocks on a plane of the touch display panel is enclosed within an orthographic projection of the non-aperture portion of the sub-pixel on the plane.

2. The touch display panel according to claim 1, further comprising a pixel defining layer, wherein the orthographic projection of the plurality of second electrode blocks on the plane of the touch display panel enclosed inside an orthographic projection of the pixel defining layer on the plane.

3. The touch display panel according to claim 2, wherein a grid in the plurality of second electrode blocks has a boarder having a width of L1, and the pixel defining layer overlapping to the borders has a width of L2, wherein $L1>3.7$ μm and $14 \text{ μm} \leq L2-L1 \leq 25$ μm.

4. The touch display panel according to claim 1, wherein the plurality of second touch electrodes each further comprises a grid hole, wherein each grid hole overlays an aperture of at least one sub-pixel of the plurality of sub-pixels.

5. The touch display panel according to claim 4,
wherein apertures of at least two sub-pixels of the plurality of sub-pixels have different shapes, and said grid hole has a same shape as the overlaid aperture of the sub-pixel; and
wherein said grid hole has an area of S1, the overlaid aperture of the sub-pixel has an area of S2, and $4 \leq S1/S2 \leq 5.5$.

6. The touch display panel according to claim 4,
wherein apertures of at least two sub-pixels of the plurality of sub-pixels have different shapes, and the grid holes in the second electrode blocks have the same shape; and
wherein each of the grid hole has an area of S3, the largest aperture of the plurality of sub-pixels has an area of S4, and $3 \leq S3/S4 \leq 4.5$.

7. The touch display panel according to claim 4, wherein each grid hole overlays apertures of three sub-pixels of the plurality of sub-pixels; and
wherein said grid hole has an area of S5, an aperture of one of the three sub-pixels has an area of S6, and $10.5 \leq S5/S6 \leq 13$.

8. The touch display panel according to claim 1, wherein in the first direction, two closest grids in two adjacent second electrode blocks of the plurality of second electrode blocks are connected to each other by one of the bridge structures.

9. The touch display panel according to claim 8, wherein the bridge structure has a length in the second direction equal to that of the grid connected to the bridge structure in the second direction.

10. The touch display panel according to claim 1, an orthographic projection of a middle portion of the bridge structure on the plane of the touch display panel overlaps an orthographic projection of the connection portion on the plane; and
wherein the middle portion of the bridge structure in the second direction has a length smaller than that of any other portion of the bridge structure in the second direction.

11. The touch display panel according to claim 1,
wherein an orthographic projection of the insulation layer on the plane of the touch display panel covers an entire touch region of the touch display panel; and
a plurality of via holes is disposed in the insulation layer, wherein the bridge structure is connected to the corresponding ones of the plurality of second electrode blocks by the via holes.

12. The touch display panel according to claim 1,
wherein an orthographic projection of the bridge structure on the plane of the touch display panel overlaps an orthographic projection of the connection portion on the plane to form an overlapping region;
wherein an orthographic projection of the insulation layer on the plane of the touch display panel covers the overlapping region; and
wherein the bridge structure comprises, in the first direction, a contact portion which extends beyond a boundary of the insulation layer and is in direct contact with said second electrode blocks.

13. The touch display panel according to claim 1, wherein a length of one of the plurality of second electrode blocks in the second direction is longest in the middle and decreases to both sides along the first direction.

14. The touch display panel according to claim 1, wherein each first electrode block of the plurality of first electrode blocks is a metal electrode, and wherein the plurality of first electrode blocks and the plurality of second electrode blocks are arranged in the same layer;
wherein each first electrode block of the plurality of first electrode blocks is in a grid structure and an orthographic projection of the plurality of first electrode blocks on the plane of the touch display panel enclosed inside an orthographic projection of the non-aperture portion of the sub-pixel on the plane.

15. The touch display panel according to claim 14, wherein each grid hole of each first electrode block of the plurality of first electrode blocks corresponds to an aperture of at least one sub-pixel of the plurality of sub-pixels.

16. The touch display panel according to claim 14, wherein the connection portion is made of metal, and the connection portion and the plurality of first electrode blocks are arranged in the same layer; and
wherein the connection portion has a grid structure and wherein the grid structure has at least one grid hole, overlaying an aperture of at least one sub-pixel of the plurality of sub-pixels.

17. The touch display panel according to claim 1, wherein a dummy electrode is arranged between one first electrode block of the plurality of first electrode blocks and one second electrode block of the plurality of second electrode blocks, which are adjacent to each other.

18. The touch display panel described in claim 1, wherein the plurality of first touch electrodes comprises touch sensing electrodes and the plurality of second touch electrodes comprises touch drive electrodes, or the plurality of first touch electrode comprises touch drive electrodes and the plurality of second touch electrodes comprises touch sensing electrodes.

19. The touch display panel according to claim 1, wherein each of the plurality of second electrode blocks is made of molybdenum, silver or aluminum, and the bridge structure is made of indium tin oxide, indium zinc oxide or indium gallium zinc oxide.

20. A touch display device, comprising a touch display panel, comprising:
- a plurality of first touch electrodes, wherein the plurality of first touch electrodes is arranged in a first direction and extends along a second direction, wherein each of the plurality of first touch electrodes comprises a plurality of first electrode blocks arranged in the second direction, and every two adjacent first electrode blocks along the second direction of the plurality of first electrode blocks are connected to each other;
- a plurality of second touch electrodes, wherein the plurality of second touch electrodes is arranged in the second direction and extends along the first direction, wherein each of the plurality of second touch electrodes comprises a plurality of second electrode blocks arranged in the first direction, and every two adjacent second electrode blocks along the first direction of the plurality of second electrode blocks are connected to each other via a bridge structure, wherein the bridge structure and the plurality of second electrode blocks are arranged in different layers, wherein the plurality of second electrode blocks is made of metal, and wherein the bridge structure is transparent; and
- a plurality of sub-pixels, wherein each sub-pixel of the plurality of sub-pixels comprises an aperture and a non-aperture portion;

wherein two adjacent first electrode blocks of the plurality of first electrode blocks in the second direction are connected to each other by a connection portion, wherein an insulation layer is arranged between the connection portion and the bridge structure, and wherein the insulation layer is in direct contact with both the bridge structure and the plurality of second electrode blocks; and wherein each second electrode block of the plurality of second touch electrodes has a grid structure and an orthographic projection of the second electrode block on a plane of the touch display panel enclosing an orthographic projection of the non-aperture portion of the sub-pixel on the plane.

* * * * *